US007284984B1

(12) United States Patent
Zyskowski

(10) Patent No.: US 7,284,984 B1
(45) Date of Patent: Oct. 23, 2007

(54) AUTOMATIC LONGITUDINAL PITCH TRIM IN AIRCRAFT COMBAT SIMULATION

(75) Inventor: Michael Kyle Zyskowski, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 10/410,704

(22) Filed: Apr. 9, 2003

(51) Int. Cl.
*G09B 9/08* (2006.01)
(52) U.S. Cl. ............................ 434/30; 434/28; 434/37; 434/51; 434/59
(58) Field of Classification Search ................ 434/28, 434/37, 45, 51; 701/11
See application file for complete search history.

(56) References Cited

U.S. PATENT DOCUMENTS

| | | | | |
|---|---|---|---|---|
| 3,026,630 A | * | 3/1962 | White, Jr. et al. ............ | 434/31 |
| 4,463,605 A | * | 8/1984 | McDowell et al. ........ | 73/866.4 |
| 4,573,925 A | * | 3/1986 | Styers ........................ | 434/49 |
| 4,646,255 A | * | 2/1987 | Ebert et al. .................... | 703/8 |
| 5,571,953 A | * | 11/1996 | Wu ............................ | 73/65.06 |
| 6,236,914 B1 | * | 5/2001 | Kaloust ........................ | 701/11 |
| 6,763,325 B1 | * | 7/2004 | Stone ............................ | 703/8 |

* cited by examiner

*Primary Examiner*—Robert E. Pezzuto
*Assistant Examiner*—Cameron Saadat
(74) *Attorney, Agent, or Firm*—Workman Nydegger

(57) ABSTRACT

An AutoTrim function automatically adjusts the trim of the elevator of a simulated aircraft to compensate for pitching moments that are not caused by a user affirmatively controlling the elevator. A flight simulator program determines a sum of the pitching moments acting on the simulated aircraft, excluding the user setting of the elevator. The sum of the longitudinal pitching moments is then set equal to zero to solve for a desired position for setting the AutoTrim control. A time lag is applied in setting the AutoTrim control to the desired position, to provide greater realism. Use of the AutoTrim control provides enhanced control authority to the user in controlling the longitudinal pitch of the aircraft. The AutoTrim control functionality is stopped as the angle of attack of the aircraft approaches a stall condition, but resumes when the plane is flying in a substantially safer flight condition.

33 Claims, 6 Drawing Sheets

AUTOMATIC LONGITUDINAL PITCH TRIM IN AIRCRAFT COMBAT SIMULATION

FIELD OF THE INVENTION

The present invention is generally directed to automatically compensating for non-elevator pitching moments in a simulated aircraft, and more specifically, provides for real-time automatic adjustment of the pitch trim control to dynamically compensate for pitching moments that are not caused by adjustment of the elevator, in an aircraft flight simulator program.

BACKGROUND OF THE INVENTION

When flying an aircraft, a pilot will typically make an elevator trim adjustment to compensate for longitudinal pitching moments that act on the aircraft independently of the pilot control of the elevator. A principal cause of such pitching moments is a difference in the center of gravity of the aircraft and its aerodynamic center. The center of gravity of an aircraft changes as fuel and ordinance are consumed, or as the distribution of mass on or within the aircraft changes during a flight. The aerodynamic center changes if the flight control configuration of the aircraft is altered, for example, as a result of extending the flaps, or lowering the landing gear.

While the elevator trim adjustment is not essential, since the pilot can control the elevator to maintain a setting that compensates for pitching moments, it is generally preferable that the pilot employ this adjustment. In many aircraft designs, the elevator trim adjustment does not reduce the range of elevator control available to the pilot. Thus, in such aircraft, a pilot will want to properly set the trim adjustment, rather than simply manually control the elevator to compensate for the longitudinal pitching moments acting on the aircraft, so that the pilot retains the full range of elevator control.

Microsoft Corporation has developed a software program entitled, "*Combat Flight Simulator 3: Battle for Europe*™" that is designed to run on a conventional personal computer. Tihs program enables a user to fly various combat aircraft in a computer simulation in which the user may engage in "dogfights" with other aircraft or fly bombing and other types of combat missions. Most users of the program find that the task of simply controlling a simulated aircraft in combat requires most of their effort and concentration. The simulation is intentionally designed to be as realistic as possible, and flight controls on the simulated aircraft closely emulate those on a real aircraft. The simulated combat aircraft include virtually all of the flight controls that are provided on an actual aircraft of the same type, including an elevator trim control, if such a control is included on the actual aircraft of that type. However, since many users of the combat flight simulation program are not experienced pilots, such users may find it difficult to attend to less critical details of flying an aircraft, such as adjusting the elevator trim control. This control should be adjusted periodically as changes occur in the center of gravity or in the aerodynamic center of an aircraft during a mission. While an experienced pilot would have little problem in manually adjusting the elevator trim control as needed, most novice users of the program will not understand the proper operation of the trim control or will find that attention to such details are just too much of a distraction from the more pressing aspects of flying an aircraft and avoiding being shot down. Thus, it would be desirable to make the task of simulated flying "easier" for less experienced users by providing an automated adjustment of the elevator pitch trim control, so that the user can attend to more critical functions required for flying the aircraft. Provision of such an automated "control assistant" should preserve the realism of the simulated flying experience, while freeing a user from actually making this less critical flight control adjustment. It would also be desirable to enable a user who has become more expert or is already experienced to selectively turn off the automatic adjustment and instead, manually adjust the longitudinal pitch trim control. Clearly, use of an automatic pitch trim control is not limited to a combat flight simulation program, but instead, is also applicable to other kinds of flight simulation programs in which inexperienced users attempt to fly simulated aircraft.

SUMMARY OF THE INVENTION

The present invention is included as part of a flight simulation program in which a user is able to pilot a simulated aircraft in a virtual flight simulation. Since, as noted above, most novice users typically do not have the understanding or skill to handle more detailed aspects of flying a simulated aircraft, the present invention automatically attends to one such detail. Specifically, this invention automatically adjusts a longitudinal pitch trim control to compensate for longitudinal pitching moments that are not the result of the user adjusting the elevator of the simulated aircraft. This control assistance is provided to the user within the flight simulator program in a manner that is generally not apparent to the user and requires no user interaction. The program automatically determines a sum of the instantaneous longitudinal pitching moments that are acting on the simulated aircraft, but excludes those that are due to elevator rate and elevator position, since the elevator is under the control of the user. Next, the program solves for a desired position for the longitudinal pitch trim control when the sum that was computed is set equal to zero. The longitudinal pitch trim control is then set to the position that was thus determined. These series of steps are repeated for each successive frame of the flight simulation program, to automatically and dynamically compensate for changes in the longitudinal pitching moments acting on the simulated aircraft that are not caused by elevator rate and elevator position.

One advantage of the present invention is that by automatically setting the longitudinal pitch trim control, additional elevator control authority is made available to the user who is piloting the simulated aircraft. Clearly, another advantage is that the user need not be concerned with this detail of flying the simulated aircraft, while still benefiting from the trim control being properly set.

A dynamic pitching moment caused by the offset between locations of a center of gravity and an aerodynamic center of the simulated aircraft is included in the sum when automatically determining the sum of the pitching moments. This offset changes over time, as the plane consumes fuel or drops load, such as munitions, or as a consequence of changes in the flight configuration (e.g., due to the user extending the flaps or lowering the landing gear).

To provide a more realistic user experience to the user who is piloting the simulated aircraft, the present invention preferably introduces a lag time before automatically setting the longitudinal pitch trim control to a computed position, in response to changes in the longitudinal pitching moment. This lag time is based on a predefined time constant.

Since the intent of the present invention is to assist the user and not to cause control problems because of the enhanced control authority provided by the automatic setting of the pitch trim control, the program stops automatically setting the longitudinal pitch trim control if the simulated aircraft is approaching a stall condition, i.e., if an angle of attack of the simulated aircraft reaches a predefined percentage of a stall angle of attack. When the flight status of the aircraft returns to a safe condition, the program resumes automatically setting the longitudinal pitch trim control.

More experienced users may prefer to manually adjust the longitudinal pitch trim control. Accordingly, in one embodiment, the program preferences enable a user to selectively disable automatically setting the longitudinal pitch trim control.

A further aspect of the present invention is directed to a memory medium on which are stored machine instructions for carrying out the steps discussed above. Yet another aspect of the present invention is directed to a system for automatically adjusting the longitudinal pitch trim control to assist a user piloting a simulated aircraft in a virtual flight simulation. The system includes a user input device for providing signals employed to control the simulated aircraft in the virtual flight simulation. These signals include an elevator control signal produced by a user affirmatively controlling an elevator of the simulated aircraft with the user input device. A processor is coupled to a memory and to the user input device to receive the signals. The memory stores machine instructions for executing the virtual flight simulation on the processor and for carrying out a plurality of related functions that are generally consistent with the steps discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 5:
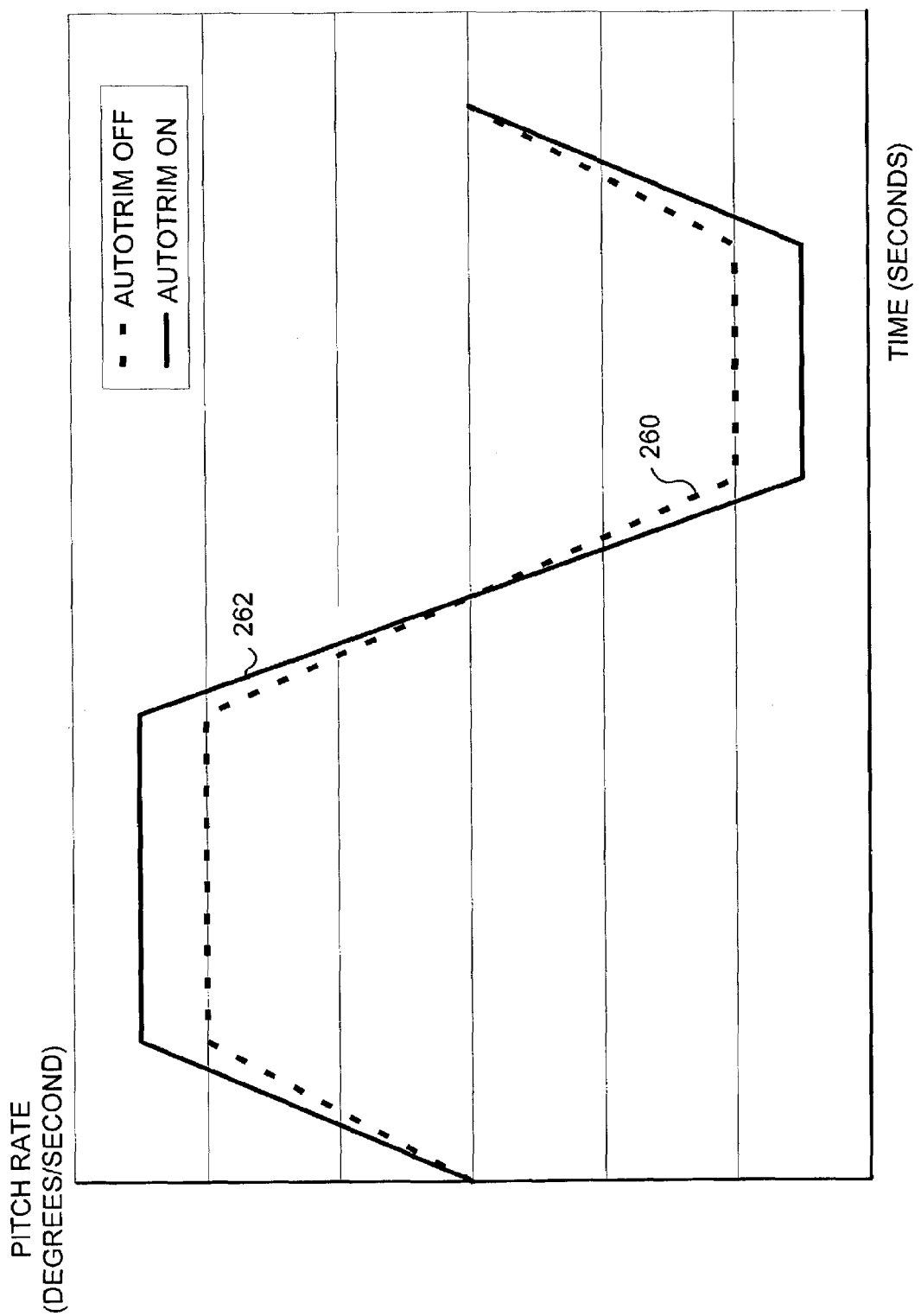
Figure 6:
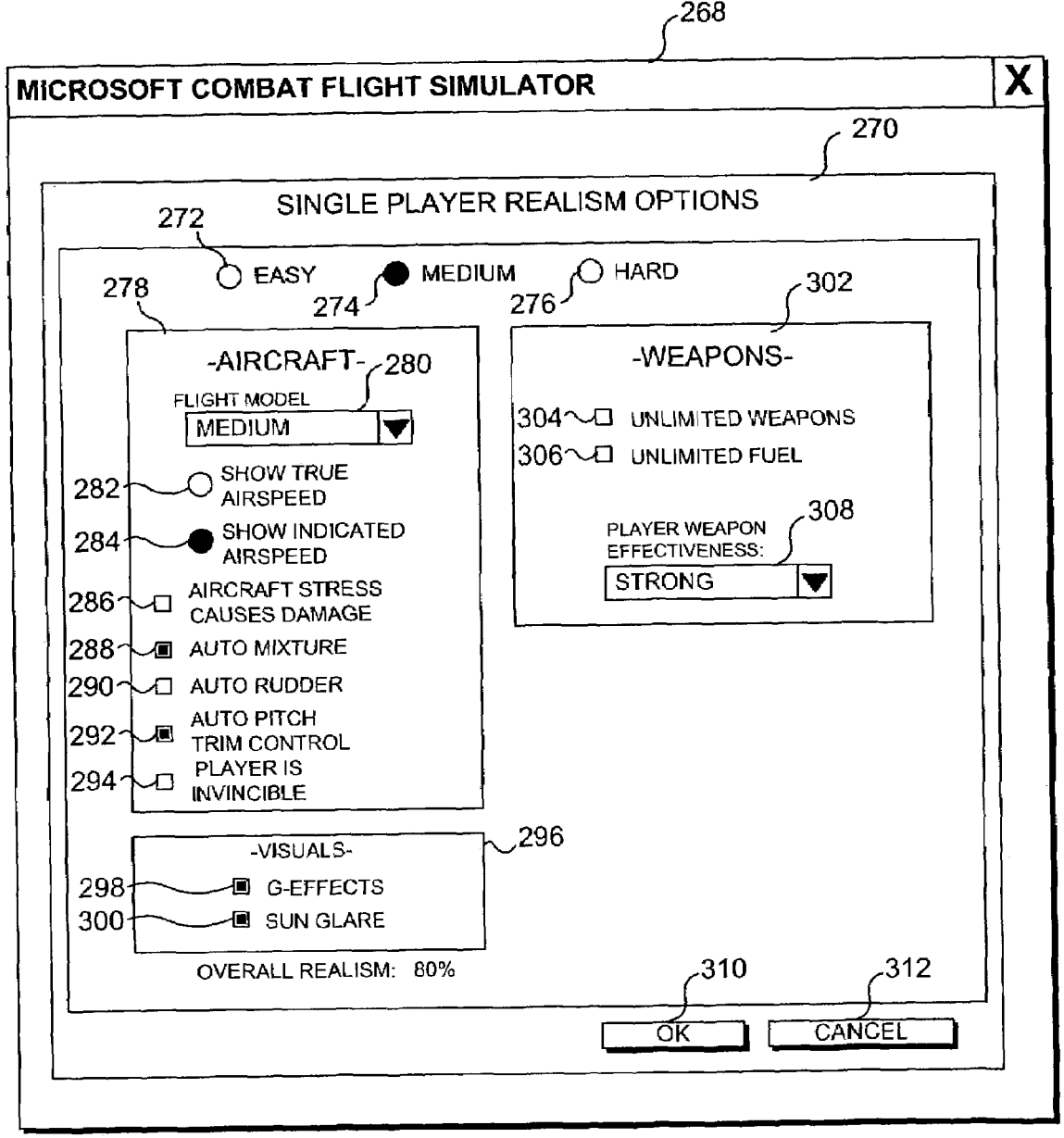

FIG. 5 is a graph of pitch rate (degrees/second) relative to time (second), comparing the pitch rate of a simulated aircraft with the AutoTrim turned on and with the AutoTrim turned off; and FIG. 6 is an exemplary graphic user interface screen similar to that employed in a combat flight simulator program in which the present invention is used, for enabling a single player to set realism options, including selectively disabling (or enabling) the auto pitch trim control (which is currently not an option in this combat flight simulator program).

DESCRIPTION OF THE PREFERRED EMBODIMENT

Exemplary System for Implementing Present Invention

Figure 1:
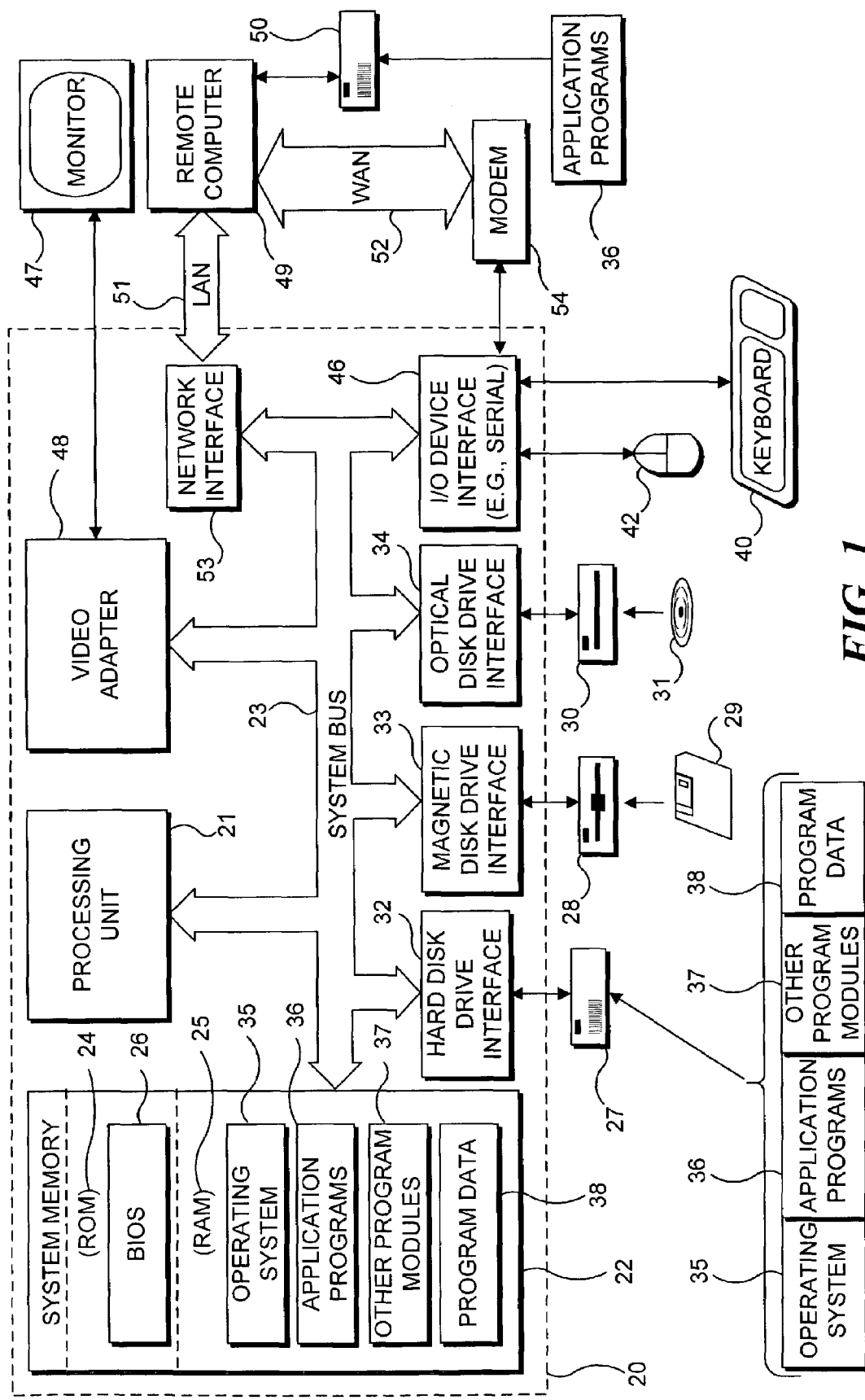
FIG. 1 is a functional block diagram of a generally conventional personal computer, which is suitable for implementing the present invention.

With reference to FIG. 1, an exemplary system for implementing the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, graphic images relating to the display of gauges and other components inside an aircraft cockpit and to scenery and other objects outside the cockpit, Web pages, and/or other information. In addition to the monitor, PCs are often coupled to other peripheral output devices (not shown), such as speakers (through a sound card or other audio interface—not shown) and printers.

As indicated above, the invention may be practiced on a single machine, however, PC 20 can also operate in a networked environment using logical connections to one or more remote computers, such as a remote computer 49, to enable multi-player interaction while simulating flying an aircraft. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46; i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. Other players coupled together over a communications network will typically use computing devices much like that described above.

Flight Simulator Environment

Figure 2:
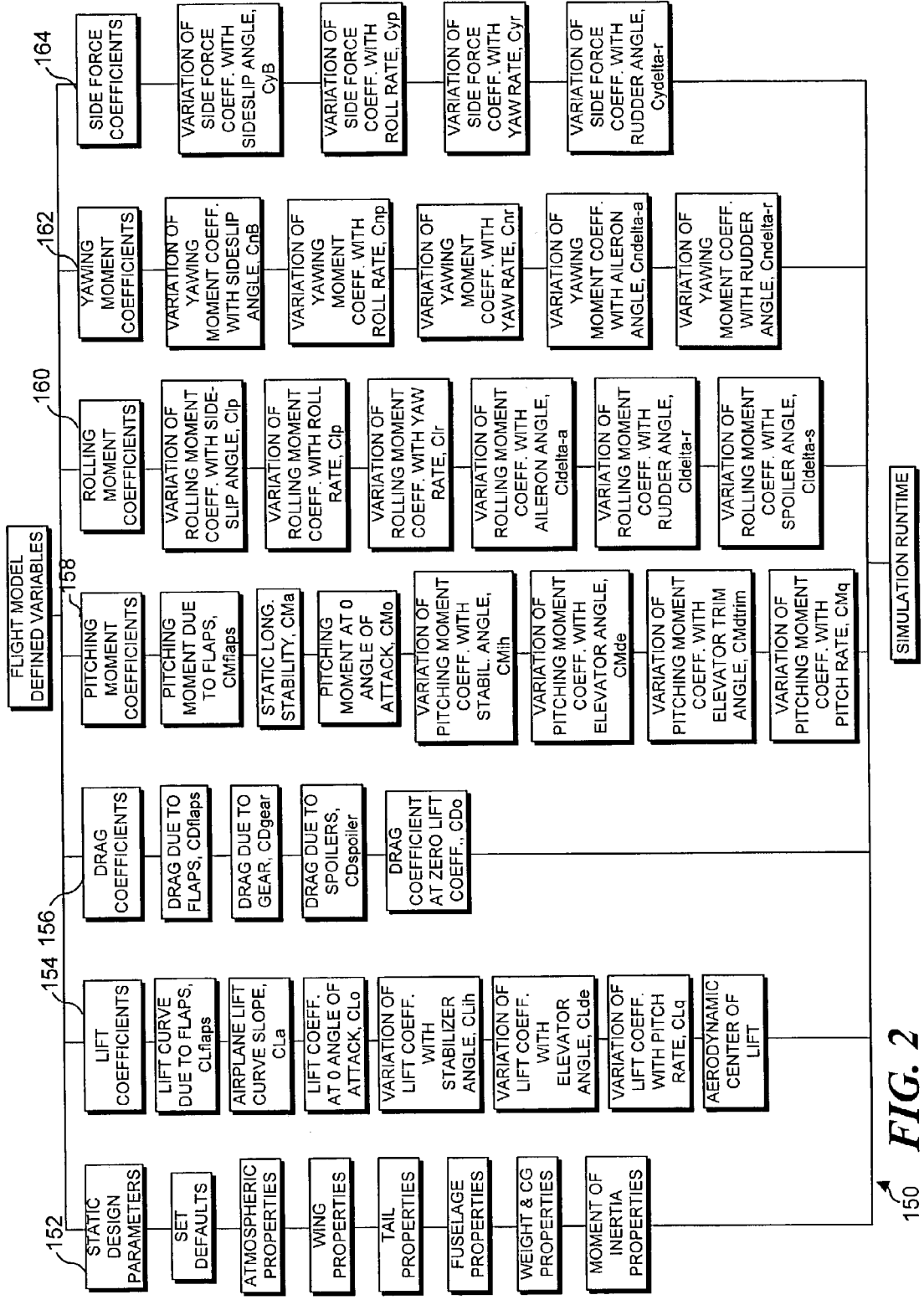
FIG. 2 is a schematic block diagram illustrating static variables defined in a flight model employed in a flight simulator program in which the present invention is optionally employed.

As illustrated in a block diagram 150 in FIG. 2, exemplary flight model defined variables employed by a combat flight simulator program in which the present invention is optionally executed are used by the flight simulator program to define characteristics of an aircraft selected by a user to produce a realistic experience when "flying" a simulated aircraft. Data employed in the flight model are divided among a number of different parameters and aerodynamic coefficients. Static design parameters 152 include default parameters that are determined as a function of the simulated aircraft chosen by a user to fly, including its wing properties, atmospheric properties, tail properties, fuselage properties, weight and center of gravity properties, and moment of inertia properties. The aerodynamic coefficients are divided into several different categories, including lift coefficients 154, drag coefficients 156, pitching moment coefficients 158, rolling moment coefficients 160, yawing moment coefficients 162, and side force coefficients 164. An FSEDIT component of the combat flight simulator program uses well known classical techniques for generating each of the aerodynamic coefficients in these different categories, applying the same formulas that are typically employed when designing actual aircraft. Details of the calculations carried out to produce these aerodynamic coefficients for use in the combat flight simulator program need not be provided herein, since they are not part of the present invention and are generally well known to those of ordinary skill in the art. Selected aerodynamic coefficients and moments of the aircraft that have thus been determined are then used to determine the position for automatically setting the longitudinal pitch trim control.

FIG. 2 lists each of the aerodynamic coefficients that are determined, and these coefficients are identified using the terms typically applied in the art. For example, those of ordinary skill will appreciate that aerodynamic coefficients in categories 160, 162, and 164 generally comprise various lateral directional coefficients in flight model data. FIG. 2 was included primarily to illustrate the level of detail and authenticity employed in the combat flight simulator to realistically provide a virtual simulation that closely emulates the response that a user would experience if actually flying a particular type of aircraft like that selected by the user in the flight simulator program.

Exemplary Preferred Embodiment of the Present Invention

Figure 3:
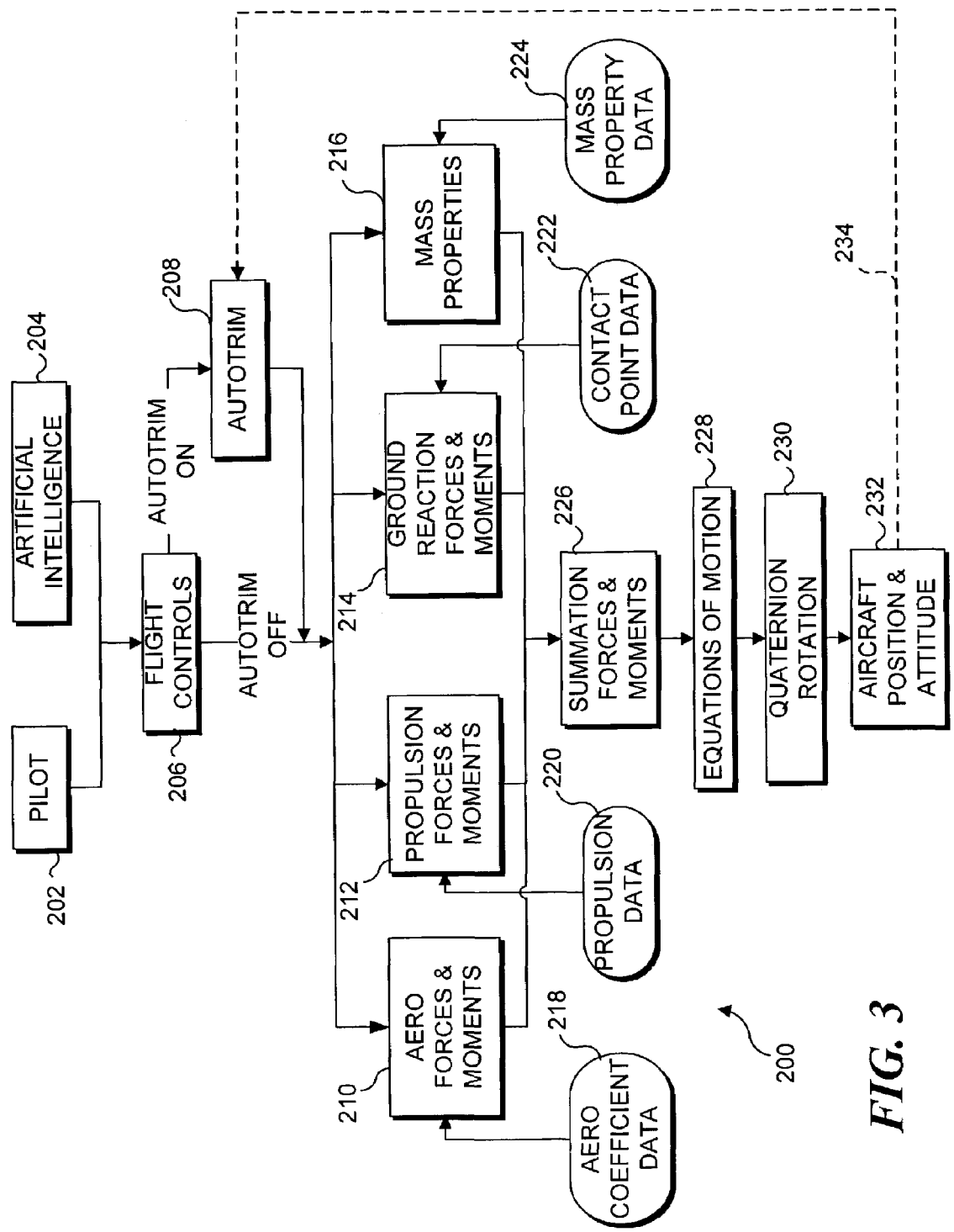
FIG. 3 is a schematic block diagram illustrating the functionality implemented in the present invention for enabling automatic adjustment of a longitudinal pitch trim control (i.e., AutoTrim) in a simulated aircraft.

As noted above, an initial preferred embodiment of the present invention is included within Microsoft Corporation's "*Combat Flight Simulator* 3: *Battle for Europe*™." However, it should be apparent that the present invention is equally applicable to almost any flight simulator program. FIG. 3 illustrates how components of the combat flight simulator program in which the present invention is employed interact and how the automatic adjustment of longitudinal pitch trim (interchangeably referred to as the "AutoTrim") is implemented in connection with these components. As shown in a block diagram 200 of FIG. 3, the user of the flight simulator program, who is acting as a pilot 202 flying one of the simulated aircraft, interacts with flight controls 206. Typically such flight controls will include a joy stick, or a yoke, and may also include foot pedals, but may simply be some other more common type of user interface such as a mouse or other type of pointing device. Also, it is typical for flight controls 206 to include keyboard 40 (as shown in FIG. 1) that produces input signals that are applied to PC 20. Specific keys on the keyboard (or on another type of input device) enable the pilot to selectively control various control options that relate to the operation and flying of the simulated aircraft. In addition, an artificial intelligence 204 interacts with the controls to enable the simulated aircraft to interact with the virtual environment in which the combat flight simulation exists.

Since more experienced pilots may prefer a more realistic flight, the option will more clearly be provided (in a subsequent commercial embodiment of the combat flight simulator program) for making manual longitudinal pitch trim adjustments, rather than relying upon the AutoTrim adjustment provided by the present invention. (The current commercial embodiment enables the AutoTrim adjustment to be selectively turned off by selecting CTRL-A on the keyboard, but the option is not exposed.) However, most novice users will find the task of flying an aircraft somewhat easier if the present invention is employed, as indicated by the use of an AutoTrim function 208 in FIG. 3. A user interface option that enables pilot 202 to selectively set AutoTrim on or off is shown in FIG. 6 and is discussed in greater detail below.

The signals produced by flight controls 206 are employed by a "SimEngine" module that determines a plurality of different moments and properties of the aircraft chosen to be flown by the user, based upon data associated with that type of aircraft. Specifically, aero forces and moments are determined in a block 210, propulsion forces and moments are determined in a block 212, and ground reaction forces and moments are determined in a block 214. Similarly, mass properties of the simulated aircraft are determined in a block 216. The aero forces and moments are determined based upon aero coefficient data as indicated in block 218. Propulsion data 220 and contact point data 222 are respectively employed for determining the propulsions forces and moments, and ground reaction forces and moments. Mass property data 224 are employed to determine the mass properties of the aircraft. From the various moments that are thus determined, a sum is calculated as indicated in a block 226, and the sum of the forces and moments is then input to equations of motion, as indicated in a block 228. A block 230 provides for carrying out a quaternion rotation, which applies this mathematical procedure to determine aircraft position and attitude, which is indicated in a block 232.

Details of the actual steps employed for determining aircraft position and attitude using the functional components noted above are not particularly relevant to the present invention, although the results of these calculations are clearly employed in determining a position for setting the AutoTrim control. Assuming that AutoTrim as been selectively turned on, a dash line 234 in FIG. 3 indicates that the aircraft position and attitude is provided as an input to the AutoTrim function to enable it to determine where to set the AutoTrim control to compensate for the longitudinal pitching moments acting on the aircraft, except for those caused by the pilot's control of the elevator and elevator rate.

Figure 4:
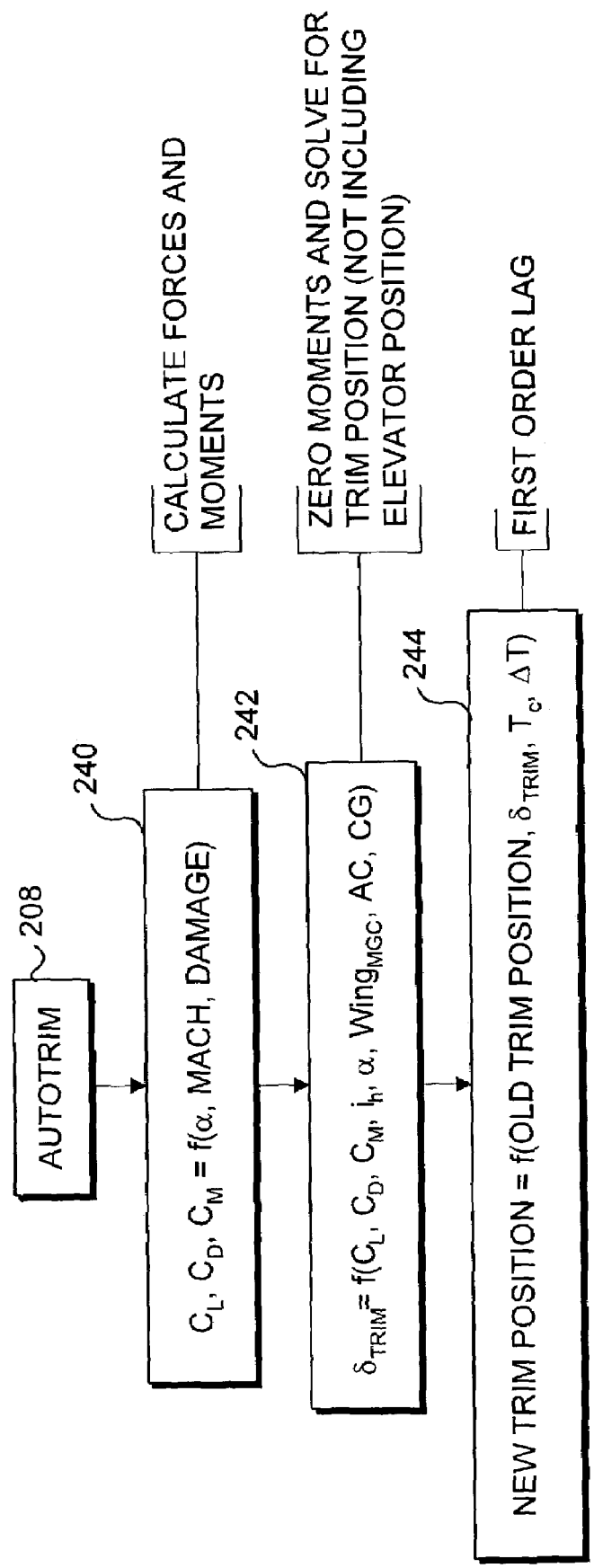
FIG. 4 is a schematic block diagram illustrating the logical steps for determining the automatic adjustment of the longitudinal pitch trim control.

Further steps implemented by the AutoTrim control function are shown in FIG. 4. As noted in a block 240, the program calculates lift, drag, and moments acting on the aircraft ($C_L$, $C_D$, and $C_M$) as a function of angle of attack (a), the speed of the aircraft (MACH), and the effect of any damage to the aircraft (unless the user has selectively determined that damage to the aircraft will not affect its flying performance, in the options setting for the combat flight simulator program—see FIG. 6). A block 242 indicates that the elevator trim position, $\delta_{TRIM}$, is then determined as a function of the forces and moments acting on the aircraft by setting the sum of the moments equal to zero, and solving for the trim position, while excluding the effect of the pilot controlled elevator position on the longitudinal pitching moments acting on the aircraft. Finally, in a block 244, a first order lag is introduced when setting the trim control, as a function of the trim position originally determined, the new trim position that was determined, a time constant, $T_C$, and a time duration, $\Delta T$. The purpose of introducing the first order lag is to provide greater realism when automatically setting the trim control to a desired position, so that the change in adjustment is not instantaneous, but instead, occurs over the lag time determined by the time constant and time interval. For example, immediately after a pilot drops a bomb, the resulting change in the center of mass relative to the aerodynamic center of the aircraft would produce a new desired position for automatically setting the AutoTrim control. Although the desired position setting can be determined virtually instantaneously, in reality, the pilot would normally take some time to manually adjust the elevator trim control to compensate for the change in the center of gravity of the plane, so that the pitching moment caused by the difference between the center of gravity and the aerodynamic center of the simulated aircraft can be zeroed out. While not required, the first order lag substantially enhances the realism of the flight simulation.

Further details will help to clarify the actual calculation of the desired position for automatically setting the AutoTrim control in accord with the preferred embodiment of the present invention. The functionality provided by the AutoTrim control of the present invention is an extension of that used to set the initial state of the aircraft when the program starts the flight simulation with a user flying the aircraft after it is already in the air, i.e., when the user does not start the simulation with a take off from the ground. Since it would not be desirable to immediately initiate simulated flight with the aircraft diving, climbing, or turning, the elevator trim position and other flight controls are initialized to ensure that the aircraft is flying on a straight and level path. To do so, the program takes into account the desired airspeed and altitude of the aircraft. As indicated above, by summing all of the longitudinal aerodynamic coefficients and moments that act on the aircraft when flying straight and level at a given airspeed and altitude, the desired elevator trim position can be determined by setting the sum of these moments to zero. Initially, it is assumed that the attitude of the simulated aircraft will not have been controlled by the pilot, and the elevator will be assumed to be at a center position when the simulated flight starts. Clearly, changes that are thereafter made to the position of the elevator by the pilot using an input device should not be included in determining the compensation for pitching moment applied by the AutoTrim control, since it is only the pitching moments that are not caused by the pilot that are to be compensated by this function.

Once the aircraft is actually being flown and controlled by the pilot, the equations used to solve for the initial position of the elevator trim control must be expanded to take into account factors such as real-time angle of attack, sideslip, thrust, and drag. A principle source of pitching moment on an aircraft is the offset between the locations of center of gravity and the aerodynamic center of the aircraft. Since the center of gravity changes as the mass distribution on the aircraft is altered due to consumption of fuel, dropping of munitions or other loads, an even the shifting of mass within the aircraft, it is apparent that during the flight, the desired AutoTrim position will change. Furthermore, changes to the flight configuration of the aircraft that alter the aerodynamic center will also change the desired position for setting for the AutoTrim control. Even changes in airspeed can cause changes in the location of the aerodynamic center.

When using the AutoTrim control, it is unnecessary for the pilot to manually adjust the trim of the elevator to compensate for such changes. A further advantage of using the AutoTrim control for compensating longitudinal pitching moments acting on the aircraft is that the AutoTrim control provides an additional elevator control authority to the pilot by increasing the elevator trim deflection in a desired pitch direction. If the AutoTrim control is not employed, a pilot must manually manipulate the elevator trim position to one that allows the full pitch control authority of the aircraft. Further, if the elevator trim is not manually modified, the elevator control authority is limited by the position of the elevator trim surface.

The specific parameters employed in the present invention are already included in the flight model data used in the combat flight simulator program. After the sum of the instantaneous pitching moments of the aircraft (not including those due to elevator position or rate terms) is determined in block 240 of FIG. 4, the sum is set equal to zero, and the elevator trim position, $\delta_{Trim}$, is determined as follows:

$$\delta_{Trim} = ((C_{mdeProp} * i_h) - C_{M0} - (C_{M\alpha} * \alpha) - (C_{Mih} * i_h) - C_{M\_gear} - C_{M\_spoilers} - C_{M\_flaps})/C_{Mdtr}$$

Additionally, the dynamic pitching moment due to the offset of the center of gravity from the aerodynamic center (static margin) must be taken into account:

$$\Delta CM = ((((C_L + (C_{Lih} * i_h) + (C_{L\_flaps} * \delta_{flap}) + (C_{L\_spoiler} * \delta_{spoiler}) + (C_{L\_gear} *$$

$\delta_{gear}))*\cos(\alpha)+(C_D+(C_{D\_flaps}*\delta_{flap})+(C_{D\_spoiler}*\delta_{spoiler})+(C_{D\_gear}*$ $\delta_{gear}))*\sin(\alpha))*(CG\_Offset.z-Aerodynamic-Center.z))-((-(C_D+(C_{D\_flaps}*\delta_{flap})+$ $(C_{D\_spoiler}*\delta_{spoiler})+(C_{D\_gear}*\delta_{gear}))*\cos(\alpha)+(C_L+(C_{Lih}*i_h)+(C_{L\_flaps}*\delta_{flap})+$ $(C_{L\_spoiler}*\delta_{spoiler})+(C_{L\_gear}*\delta_{gear}))*\sin(\alpha)*(CG\_Offset.y-AerodynamicCenter.y)))/Wing_{MGC}$ Then:

$\delta_{Trim}=\delta_{Trim}-\Delta CM/C_{Mdtr}$

Finally, the first order lag of block 244 in FIG. 4 is introduced to provide a realistic "feel" to the dynamic update of the AutoTrim control position (so that the update of the trim position is not instantaneous, but instead, is driven to an instantaneous value over time). The equation used in block 244 is as follows:

Trim Position+=($\delta_{trim}$-Trim Position)*$T_c$*$\Delta T$

The variables referenced in the above equations are defined as follows:
  $\alpha$=Angle of Attack
  $i_h$=Horizontal Tail Incidence Angle
  $\delta_{Trim}$=Elevator Trim Surface Deflection
  $\delta_{flap}$=Flap Surface Deflection
  $\delta_{spoiler}$=Spoiler Surface Deflection
  $\delta_{gear}$=Gear Position (up or down)
  $C_{mdeProp}$=Elevator Propwash Pitching Moment Coefficient
  $C_{M0}$=Zero-Lift Pitching Moment Coefficient
  $C_{Ma}$=Variation of Pitching Moment Coefficient with Angle of Attack
  $C_{Mih}$=Variation of Pitching Moment Coefficient with Horizontal Tail Stabilizer Angle
  $C_{M\_gear}$=Pitching Moment Coefficient due to Landing Gear
  $C_{M\_spoilers}$=Pitching Moment Coefficient due to Spoiler Deflection
  $C_{M\_flaps}$=Pitching Moment Coefficient due to Flap Deflection
  $C_{Mdtr}$=Pitching Moment Coefficient due to Elevator Trim Deflection
  $C_L$=Coefficient of Lift
  $C_{Lih}$=Variation of Lift Coefficient with Horizontal Tail Stabilizer Angle
  $C_{L\_flaps}$=Lift Coefficient due to Flap Deflection
  $C_{L\_spoiler}$=Lift Coefficient due to Spoiler Deflection
  $C_{L\_gear}$=Lift Coefficient due to Landing Gear Extension
  $C_D$=Coefficient of Drag
  $C_{D\_flaps}$=Drag Coefficient due to Flap Deflection
  $C_{D\_spoiler}$=Drag Coefficient due to Spoiler Deflection
  $C_{D\_gear}$=Drag Coefficient due to Landing Gear Extension
  $CG\_{Offset}$=Vector Offset of CG Position from Reference Datum
  AerodynamicCenter=Vector Offset of Aerodynamic Center Position from Reference Datum
  $Wing_{MGC}$=Wing Mean Geometric Chord
  $T_c$=Time Constant
  $\Delta T$=Time Delta The position of the trim control is limited to positive and negative geometric limits and is applied to the simulated aircraft control inputs. In the combat flight simulator program, the SimEngine module processes successive simulation frames, each of which corresponds to a time slice that is used for simulating aircraft motion. Thus, the determination of the position for the AutoTrim control is repetitively implemented, so that the position is updated for each such frame.

When a user pulls the simulated aircraft into a nose-up pitching moment condition by adjusting the elevator to climb, the AutoTrim control increases the elevator trim and adds additional authority to the available control power in the pitch-up direction. Similarly, when the pilot sets the elevator to pitch the simulated aircraft in a nose down attitude to dive, the AutoTrim control increases the elevator trim and adds authority to the available control power in the pitch-down direction.

It is important to understand that the AutoTrim control is not in anyway equivalent to an autopilot function, since the AutoTrim control assists the pilot in the desired direction of flight relative to the longitudinal pitch axis of the simulated aircraft. In contrast, an autopilot opposes changes made by a pilot, thereby overriding the control authority of the pilot in regard to making longitudinal pitching changes. The typical autopilot function does not have any need for an AutoTrim feature that assists in providing control authority. Unlike an autopilot that does not use pilot input to fly an aircraft, the present invention is intended to be a "control assistant" that enhances the experience of the pilot flying a simulated aircraft and is particularly useful for an inexperienced or novice pilot who might not otherwise understand how to properly manually set the elevator trim, particularly in a simulated aircraft of the World War II vintage. However, it will be clear that the present invention is also applicable to other types of aircraft and is not in any way limited to any particular type of aircraft, age of aircraft, or limited to use in a particular application, such as a combat flight simulator.

FIG. 5 illustrates the idealized effect of the AutoTrim control function on pitch rate. In this Figure, two graphs illustrate the effects of enabling the AutoTrim functionality during a high-G push-over and pull-up maneuver. This maneuver is repeated with AutoTrim on and AutoTrim off to produce the two graphs. The results are indicated by a dash line 260 when the AutoTrim function is set off, and a solid line 262 when the AutoTrim function is set on. It is clear that use of the AutoTrim control function in accord with the present invention provides a substantially improved pitch rate, in degrees per second, compared to not using the AutoTrim feature. Thus, FIG. 5 provides clear evidence of the improved control authority provided by using the AutoTrim control function. While it is true that manually trimming the elevator could provide the same benefits in pitch rate, it is likely that only an experienced pilot would be able to both control the aircraft during such a maneuver, and manually adjust the elevator trim control. Similar benefits are expected and have been observed in the combat flight simulator program during high-G turns and other maneuvers involving large control inputs relative to the longitudinal pitch axis.

Because the use of the AutoTrim feature provides enhanced control authority, it is possible that a pilot who is less experienced in flying a simulated aircraft might be slightly more likely to cause the aircraft to reach a stall condition under certain conditions. Accordingly, a preferred embodiment of the AutoTrim control function automatically disables the AutoTrim feature as the simulated aircraft approaches a stall angle of attack to avoid the simulated aircraft inadvertently entering into a stall condition. Preferably, once the angle of attack of the aircraft is within a predefined percentage of a stall angle of attack, e.g., about 70%, the program automatically shuts off the AutoTrim control functionality. Thereafter, once the angle of attack of the simulated aircraft returns to a substantially safer level (i.e., one at which the simulated aircraft is substantially less likely to reach a stall condition), the AutoTrim control feature is automatically restarted and permitted to operate as described above.

As users of the combat flight simulator program become more experienced, it is possible that they may choose to manually set the trim control for the elevator and elect not to employ the automatic trim control function. FIG. 6 illustrates a graphic user interface 268 that shows single player realism options 270, which include various control settings that determine the realism of the experience by the user when flying a simulated airplane. Various default option settings can quickly be selected by choosing one of the three different difficulty categories, including an "easy" category 272, a "medium" category 274, and a "hard" category 276. In FIG. 6, medium category 274 has been selected and each of the default options corresponding to that selection are indicated. The flight model is set to a medium level 280, for the aircraft chosen by the user, in an aircraft option block 278. In this aircraft options block, a radio button 282 for showing true airspeed is not selected, while a radio button 284 for showing indicated airspeed is. A check box 286 is not selected, indicating that the aircraft will not show stress caused by damage that it sustains. A check box 288 for auto (fuel) mixture is selected, while a checkbox 290 for auto rudder is not. Most important in regard to the present invention, a check box 292 is selected, showing that AutoTrim control function is enabled. If the user had selected hard category 276, checkbox 292 would not have been selected by default. For medium category 274, a checkbox 294 is not selected, indicating that the player is not invincible.

Visual options 296 include a G-effects check box 298 that is selected, and a sun glare check box 300 that is selected. Weapons options box 302 includes unlimited weapons at a check box 304, and unlimited fuel at a check box 306, neither of which is selected. However, a dropdown list box 308 for player weapon effectiveness shows that the level is set to strong. Control blocks 310 and 312 are provided for respectively indicating that the selections are okay or canceling any changes to the selections. It should be understood that the combat flight simulator program in which the present invention is initially commercially used does not include an option for disabling the AutoTrim feature. However, in a next version of this commercial product, it is likely that the option will be included, generally as shown in FIG. 6.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method for automatically compensating for longitudinal pitching moments acting on a simulated aircraft in a virtual flight simulation, comprising the steps of:
    (a) determining a sum of longitudinal aerodynamic coefficients and moments acting on the simulated aircraft;
    (b) as a function of the sum, automatically setting a longitudinal pitch trim control of the simulated aircraft; and
    (c) automatically adjusting the setting of the longitudinal pitch trim control of the simulated aircraft in response to changes in dynamic forces acting on the simulated aircraft to change its longitudinal pitch, except for those caused by a user controlling an elevator of the simulated aircraft to affirmatively change a longitudinal pitch of the simulated aircraft, said dynamic forces including a pitching moment that is due to a difference between locations of a center of gravity and an aerodynamic center of the simulated aircraft in the virtual flight simulation.

2. The method of claim 1, wherein the step of automatically adjusting comprises the steps of automatically determining and adjusting the setting of the longitudinal pitch trim control as a function of a plurality of parameters in the virtual flight simulation, while excluding any contribution to the dynamic forces caused by the user varying the elevator of the simulated aircraft to affirmatively change the longitudinal pitch of the simulated aircraft, said plurality of parameters including a real-time angle of attack of the simulated aircraft, a sideslip of the simulated aircraft, a thrust of the simulated aircraft, and a drag acting on the simulated aircraft.

3. The method of claim 1, wherein the step of automatically adjusting the setting provides additional control authority to the user when affirmatively changing the longitudinal pitch of the simulated aircraft with the elevator of the simulated aircraft.

4. The method of claim 1, further comprising the step of introducing a time lag before adjusting the setting of the longitudinal pitch trim control in response to changes in the dynamic forces, to enhance a realism experienced by the user flying the simulated aircraft in the virtual flight simulation.

5. The method of claim 1, further comprising the step of responding to an impending stall condition of the simulated aircraft by stopping automatically setting the longitudinal pitch trim control.

6. The method of claim 5, wherein the step of stopping automatically setting the longitudinal pitch control occurs when an angle of attack of the simulated aircraft reaches a predefined percentage of a stall angle of attack of the simulated aircraft.

7. The method of claim 5, further comprising the step of resuming automatically setting of the longitudinal pitch trim control when the simulated aircraft achieves an improved flight condition in which the stall condition is substantially less likely to occur in the virtual flight simulation.

8. A memory medium on which machine instructions are stored for carrying out the steps of claim 1.

9. A system for automatically compensating for longitudinal pitching moments acting on a simulated aircraft in a virtual flight simulation, comprising:
    (a) a user input device for providing user input signals used to control the simulated aircraft in the virtual flight simulation, said user input signals including an elevator control signal input produced by a user affirmatively controlling an elevator of the simulated aircraft with the user input device;
    (b) a processor coupled to the user input device to receive the user input signals; and
    (c) a memory coupled to the processor, said memory storing a plurality of machine instructions for executing the virtual flight simulation on the processor and for carrying out a plurality of related functions, including:

(i) determining a sum of longitudinal aerodynamic coefficients and moments acting on the simulated aircraft;
(ii) as a function of the sum, automatically setting a longitudinal pitch trim control of the simulated aircraft; and
(iii) automatically adjusting the setting of the longitudinal pitch trim control of the simulated aircraft in response to changes in dynamic forces acting on the simulated aircraft to change its longitudinal pitch, except for those caused by a user controlling an elevator of the simulated aircraft to affirmatively change a longitudinal pitch of the simulated aircraft, said dynamic forces including a pitching moment that is due to a difference between locations of a center of gravity and an aerodynamic center of the simulated aircraft in the virtual flight simulation.

10. The system of claim 9, wherein the machine instructions cause the processor to automatically determine and adjust the setting of the longitudinal pitch trim control as a function of a plurality of parameters in the virtual flight simulation, while excluding any contribution to the dynamic forces caused by a user using the user input device to position the elevator of the simulated aircraft to affirmatively change the longitudinal pitch of the simulated aircraft, said plurality of parameters including a real-time angle of attack of the simulated aircraft, a sideslip of the simulated aircraft, a thrust of the simulated aircraft, and a drag acting on the simulated aircraft.

11. The system of claim 9, wherein the machine instructions further cause the processor to introduce a time lag before adjusting the setting of the longitudinal pitch trim control in response to changes in the dynamic forces, to enhance a realism experienced by the user flying the simulated aircraft in the virtual flight simulation.

12. The system of claim 9, wherein the machine instructions further cause the processor to respond to an impending stall condition of the simulated aircraft by stopping automatically setting the longitudinal pitch trim control.

13. The system of claim 12, wherein the processor stops automatically setting the longitudinal pitch control when an angle of attack of the simulated aircraft reaches a predefined percentage of a stall angle of attack of the simulated aircraft.

14. The system of claim 12, wherein having stopped automatically setting the longitudinal pitch trim control, the processor resumes automatically setting the longitudinal pitch trim control when the simulated aircraft achieves an improved flight condition in which the stall condition is substantially less likely to occur in the virtual flight simulation.

15. A method for assisting a user piloting a simulated aircraft in a virtual flight simulation, by automatically adjusting a longitudinal pitch trim control, comprising the steps of:
(a) automatically determining a sum of instantaneous longitudinal pitching moments acting on the simulated aircraft, except those due to elevator rate and elevator position;
(b) solving for a position of the longitudinal pitch trim control when the sum is set equal to zero;
(c) automatically setting the longitudinal pitch trim control to the position; and
(d) repeating steps (a) through (c) to reiteratively automatically set the longitudinal pitch trim control to compensate for longitudinal pitching moments of the simulated aircraft that are not caused by elevator rate and elevator position.

16. The method of claim 15, wherein automatically setting the longitudinal pitch trim control provides an additional elevator control authority available to the user who is piloting the simulated aircraft.

17. The method of claim 15, wherein the step of automatically determining the sum includes the step of automatically determining a dynamic pitching moment caused by an offset between locations of a center of gravity and an aerodynamic center of the simulated aircraft.

18. The method of claim 15, further comprising the step of introducing a lag time when automatically setting the longitudinal pitch trim control to the position, to provide a more realistic user experience to the user who is piloting the simulated aircraft.

19. The method of claim 18, wherein the lag time is based on a predefined time constant.

20. The method of claim 15, further comprising the step of discontinuing automatically setting the longitudinal pitch trim control to the position if the simulated aircraft is approaching a stall condition.

21. The method of claim 20, wherein the step of discontinuing is implemented if an angle of attack of the simulated aircraft reaches a predefined percentage of a stall angle of attack of the simulated aircraft.

22. The method of claim 21, further comprising the step of resuming automatically setting the longitudinal pitch trim control to the position, after the simulated aircraft achieves a substantially safer flight condition in which a likelihood of stalling is substantially less than when the step of discontinuing automatically setting the longitudinal pitch trim control to the position was implemented.

23. The method of claim 15, further comprising the step of enabling the user to selectively disable automatically setting the longitudinal pitch trim control, to permit the user to manually set the longitudinal pitch trim control.

24. A memory medium on which are stored machine instructions for carrying out the steps of claim 15.

25. A system for assisting a user piloting a simulated aircraft in a virtual flight simulation, by automatically adjusting a longitudinal pitch trim control, comprising:
(a) a user input device for providing user input signals used to control the simulated aircraft in the virtual flight simulation, said user input signals including an elevator control signal input produced by a user affirmatively controlling an elevator of the simulated aircraft with the user input device;
(b) a processor coupled to the user input device to receive the user input signals;
(c) a memory coupled to the processor, said memory storing a plurality of machine instructions for executing the virtual flight simulation on the processor and for carrying out a plurality of related functions, including:
(i) automatically determining a sum of instantaneous longitudinal pitching moments acting on the simulated aircraft, except those due to elevator rate and elevator position;
(ii) solving for a position of the longitudinal pitch trim control when the sum is set equal to zero;
(iii) automatically setting the longitudinal pitch trim control to the position; and
(iv) repeating (i) through (iii) to reiteratively automatically set the longitudinal pitch trim control to compensate for longitudinal pitching moments of the simulated aircraft that are not caused by elevator rate and elevator position.

26. The system of claim 25, wherein automatically setting the longitudinal pitch trim control provides an additional elevator control authority available to a user who is piloting the simulated aircraft.

27. The system of claim 25, wherein the machine instructions further cause the processor to automatically determine a dynamic pitching moment caused by an offset between locations of a center of gravity and an aerodynamic center of the simulated aircraft.

28. The system of claim 25, wherein the machine instructions further cause the processor to introduce a lag time when automatically setting the longitudinal pitch trim control to the position, to provide a more realistic user experience to a user who is piloting the simulated aircraft.

29. The system of claim 28, wherein the lag time is based on a predefined time constant.

30. The system of claim 25, wherein the machine instructions further cause the processor to discontinue automatically setting the longitudinal pitch trim control to the position if the simulated aircraft is approaching a stall condition.

31. The system of claim 30, wherein the processor discontinues automatically setting the longitudinal pitch trim control to the position if an angle of attack of the simulated aircraft reaches a predefined percentage of a stall angle of attack of the simulated aircraft.

32. The system of claim 31, wherein the machine instructions further cause the processor to resume automatically setting the longitudinal pitch trim control to the position, after the simulated aircraft achieves a substantially safer flight condition in which a likelihood of stalling is substantially less than when the processor discontinued automatically setting the longitudinal pitch trim control to the position.

33. The system of claim 25, wherein the machine instructions further cause the processor to enable a user to selectively disable automatically setting the longitudinal pitch trim control, to permit a user to manually set the longitudinal pitch trim control.

* * * * *